United States Patent
Pin et al.

(10) Patent No.: US 12,500,772 B2
(45) Date of Patent: Dec. 16, 2025

(54) METHOD FOR GRANTING A USER ACCESS THROUGH A USER ACCESS DEVICE HOSTING A CLIENT APPLICATION TO A SERVICE COMING FROM A SET OF SERVICES OF A SERVER APPLICATION HOSTED BY A DISTANT SERVER

(71) Applicant: THALES DIS FRANCE SAS, Meudon (FR)

(72) Inventors: Yannick Pin, Marseilles (FR); Asad Mahboob Ali, Austin, TX (US)

(73) Assignee: THALES DIS FRANCE SAS, Meudon (FR)

( * ) Notice: Subject to any disclaimer, the term of this patent is extended or adjusted under 35 U.S.C. 154(b) by 151 days.

(21) Appl. No.: 18/556,111

(22) PCT Filed: Apr. 15, 2022

(86) PCT No.: PCT/EP2022/060168
§ 371 (c)(1),
(2) Date: Oct. 19, 2023

(87) PCT Pub. No.: WO2022/223484
PCT Pub. Date: Oct. 27, 2022

(65) Prior Publication Data
US 2024/0187244 A1   Jun. 6, 2024

(30) Foreign Application Priority Data
Apr. 19, 2021   (EP) .................................. 21305515

(51) Int. Cl.
*H04L 29/06* (2006.01)
*H04L 9/32* (2006.01)

(52) U.S. Cl.
CPC .......... *H04L 9/3234* (2013.01); *H04L 9/3231* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 7,987,509 B2 * | 7/2011 | Feigenbaum | H04L 61/30 726/28 |
| 8,364,957 B2 * | 1/2013 | Andreev | H04L 63/0815 713/168 |

(Continued)

OTHER PUBLICATIONS

"The Authoritative Dictionary of IEEE Standards Terms, Seventh Edition," in IEEE Std 100-2000 , vol. No., pp. 1-1362, Dec. 11, 2000, doi: 10.1109/IEEESTD.2000.322230. (Year: 2000).*

(Continued)

*Primary Examiner* — Jeffery L Williams

(57) ABSTRACT

A method for granting a user access through a user access device hosting a client application to a service of a server application hosted by a server includes sending by a server application a user authentication request, a primary challenge, an URL, and a unique user identifier to a secure peripheral device hosting a device application, checking the user identity, building a flag using the result of a comparison between user data signals and the ones that have been stored during a user-device binding process, generating a primary response, sending the primary response to the server, verifying the validity of the primary response, and granting or denying the user access to the service.

16 Claims, 6 Drawing Sheets

(56) References Cited

U.S. PATENT DOCUMENTS

| | | | | |
|---|---|---|---|---|
| 8,543,675 | B1* | 9/2013 | Yiu | G06F 16/957 |
| | | | | 709/245 |
| 8,732,805 | B2* | 5/2014 | Kavantzas | H04L 63/0846 |
| | | | | 713/168 |
| 10,685,350 | B2* | 6/2020 | Osborn | G06Q 20/343 |
| 11,290,464 | B2* | 3/2022 | Badhwar | H04L 63/0807 |
| 12,126,647 | B2* | 10/2024 | Lindemann | H04L 9/3236 |
| 2004/0210771 | A1* | 10/2004 | Wood | G06F 21/6209 |
| | | | | 726/8 |
| 2006/0122861 | A1* | 6/2006 | Scott | G06Q 10/00 |
| | | | | 705/7.19 |
| 2009/0235349 | A1 | 9/2009 | Lai et al. | |
| 2013/0086651 | A1* | 4/2013 | Kavantzas | H04L 63/0846 |
| | | | | 726/5 |
| 2013/0086652 | A1* | 4/2013 | Kavantzas | G06F 21/335 |
| | | | | 709/204 |
| 2014/0189779 | A1* | 7/2014 | Baghdasaryan | H04L 63/0853 |
| | | | | 726/1 |
| 2014/0289833 | A1* | 9/2014 | Briceno | G06F 21/31 |
| | | | | 726/5 |
| 2017/0104754 | A1* | 4/2017 | Brickel | H04L 67/1097 |
| 2018/0191501 | A1* | 7/2018 | Lindemann | H04L 9/0833 |
| 2018/0191695 | A1* | 7/2018 | Lindemann | H04L 63/0853 |
| 2019/0222424 | A1* | 7/2019 | Lindemann | H04L 9/3297 |
| 2019/0253404 | A1* | 8/2019 | Briceno | H04L 63/205 |
| 2020/0104841 | A1* | 4/2020 | Osborn | G06Q 20/204 |
| 2021/0058256 | A1* | 2/2021 | Nishimura | G06F 21/335 |
| 2021/0194883 | A1* | 6/2021 | Badhwar | H04L 63/107 |
| 2021/0194919 | A1* | 6/2021 | Lindemann | H04L 9/3247 |
| 2021/0226794 | A1* | 7/2021 | Axdorff | H04W 12/084 |
| 2021/0327008 | A1* | 10/2021 | Salah | G06F 8/38 |
| 2022/0116390 | A1* | 4/2022 | Jass | H04W 12/06 |
| 2023/0179589 | A1* | 6/2023 | Kopack | H04L 63/18 |
| | | | | 726/4 |
| 2023/0229750 | A1* | 7/2023 | Weiner | G06F 21/35 |
| | | | | 726/17 |
| 2024/0187244 | A1* | 6/2024 | Pin | H04L 63/0853 |
| 2024/0419771 | A1* | 12/2024 | Nussbaum | G06F 21/34 |
| 2025/0039169 | A1* | 1/2025 | Lindemann | H04L 63/20 |

OTHER PUBLICATIONS

International Search Report (PCT/ISA/210) and Written Opinion (PCT/ISA/237) mailed on Oct. 28, 2022, by the European Patent Office as the International Searching Authority for current International Application No. PCT/EP2022/060168—[40 pages].

Fido Al.I.iance: "FIDO UAF Specification vl.1", Oct. 5, 2016 (Oct. 5, 2016), XP055428722, Retrieved from the Internet: URL:https://fidoal.l.iance.org/specs/fido-ua f-vl.1-rd-20161005.zip; [i;-etrieved on Nov. 24, 2017]; p. 34; p. 186.

Anonymous: "Black FP Gaming Mouse with Fingerprint Security", Dec. 31, 2016 (Dec. 31, 2016), XP055972543, Retrieved from the Internet: URL:https://www.ttesports.com/files/Product_download/blackfp_dm.pdf [retrieved on Oct. 18, 2022]; p. 1-p. 6.

Buckler Craig: "What is a Rest API?—SitePoint", Aug. 24, 2022 (Aug. 24, 2022), XP055973341, Retrieved from the Internet: URL:https://www.sitepoint.com/rest-api/; [retrieved on Oct. 20, 2022]; p. 1.

* cited by examiner

METHOD FOR GRANTING A USER ACCESS THROUGH A USER ACCESS DEVICE HOSTING A CLIENT APPLICATION TO A SERVICE COMING FROM A SET OF SERVICES OF A SERVER APPLICATION HOSTED BY A DISTANT SERVER

FIELD OF USE

The present invention relates to a method for granting a user access through a user access device hosting a client application to a service coming from a set of services of a server application hosted by a distant server. It also relates to a corresponding system.

BACKGROUND

When a user has performed a login to a server application hosted by a distant server and there is a user session open, and he wants to access to a service of said server application through a user access device, a method for granting a user access to said service coming from a set of services of a server application hosted by a distant server, that is well-known by the man skilled in the art, comprises a checking of the user identity once and for all to access the distant server via a VNP (Virtual Private Network) solution. Once said user identity is checked, the user is given full access to any service coming from a set of services of the server application hosted by said distant server, via a VNP connection.

One problem of this prior art is that it does not fit with the concept of zero trust security model where user identity is to be checked not once only, but regularly, as is it considered that all network traffic should be considered untrusted.

It is an object of the invention to provide a method for granting a user access through a user access device hosting a client application to a service coming from a set of services of a server application hosted by a distant server, which resolves the problem above-stated.

SUMMARY

To this end, it is provided a method for granting a user access through a user access device hosting a client application to a service coming from a set of services of a server application hosted by a distant server, wherein said method comprises:

during a user session, receiving by said client application through said user access device a service access request and forwarding it to said distant server, sending by said server application through said distant server a user authentication request, a primary challenge, an URL of said service, and a unique user identifier to said user access device that forwards them to a secure peripheral device to which it is logically connected to, said user access device acting as a gateway between said secure peripheral device and said distant server, said secure peripheral device hosting a device application, upon receiving said user authentication request, checking by said device application through said secure peripheral device the user identity, building by said device application through said secure peripheral device a flag according to said checking using the result of a comparison between user data signals and the ones that have been stored within said secure peripheral device during a user-device binding process, or relying on a last user authentication validity if a period of time is not exceeded, generating by said device application through said secure peripheral device a primary response based on said flag, on said primary challenge, and on a secret device key associated to said unique user identifier and to said URL and which has been stored within said secure peripheral device during the user-device binding process, sending back by said device application through said secure peripheral device said primary response to said user access device that forwards it to said distant server, verifying by said server application through said distant server the validity of said primary response, according to said primary response, granting or denying by said server application through said distant server the user access to said service through said user access device.

As we will see in further details, the user identification is performed when the user wants to access a service of said server application during a user session. Hence, there is a continuous evaluation of what the user requests contrary to the prior art. The server application through said distant server can trigger the user identity verification upon receiving a service access request, even in the middle of an application flow, hence during an on-going application flow. Hence, this method complies with the zero trust security model. Hence, the method permits to achieve continuous identity verification within an application transaction flow.

According to non-limitative embodiments of the invention, the method in accordance with the invention further comprises the following characteristics.

In a non-limitative embodiment, said primary response is generated based further on at least one stamp.

In a non-limitative embodiment, the user data signals are biometric data.

In a non-limitative embodiment, said secure peripheral device is a mouse with fingerprint scanner or a keyboard with fingerprint scanner, or a Smartphone with fingerprint scanner or with a front camera.

In a non-limitative embodiment, if the last user authentication is not valid, the method further comprises the display of a primary message inviting the user to authenticate himself by inputting his user data signals through said secure peripheral device.

In a non-limitative embodiment, the validity of the last user authentication is verified according to a timestamp transmitted when the user session has started.

In a non-limitative embodiment, the secret device key is composed of an encryption key and of a message authentication code key, and the verifying of the validity of the primary response is performed by:

verifying its integrity using said message authentication code key, and deciphering a primary cryptogram using said encryption key and comparing it to said primary challenge, and verifying said flag.

In a non-limitative embodiment, said server application through said distant server grants or denies the user access to said service(S) through said user access device according also to security policies.

In a non-limitative embodiment, the user-device binding process comprises:

receiving by said client application through said user access device a binding request comprising user credentials, and forwarding it to said distant server, verifying by said server application through said distant server said user credentials, computing by said server application through said distant server a primary hash based on one of said user credentials and said secret device key based on said URL, on said primary hash and on said unique user identifier, and storing said secret device key and said primary hash, sending back by said server application through said distant server said unique user identifier, said URL and a secondary challenge to said user access device, computing by said client application through said user access device a secondary hash based on said one of said user credential, and forwarding it with said unique user identifier, said URL, said secondary challenge to said secure peripheral device, displaying by said client application through said user access device instructions for the user to input user data signals for performing user enrollment, computing by said device application through said secure peripheral device said secret device key based on said URL, on said unique user identifier and said secondary hash, and store a mapping of said secret device key with the user data signals, said unique user identifier, and said URL, generating by said device application through said secure peripheral device a secondary response based on said secondary challenge and on said secret device key, and send it to said user access device that forwards it to said distant server, verifying by said server application through said distant server the validity of said secondary response, if said secondary response is valid, storing by said server application through said distant server a mapping of the secret device key with the unique user identifier and said URL.

In a non-limitative embodiment, said secondary response is generated based further on at least one stamp.

In a non-limitative embodiment, the reception of said binding request is triggered when said server application through said distant server receives from said user access device a login request to a user account related to said server application In a non-limitative embodiment, the user-device binding process further comprises:
notifying by said server application through said distant server the completion of the user-device binding to said user access device that forwards it to said secure peripheral device,
displaying by said client application through said user access device a secondary message indicating the completion of the user-device binding.

There is also provided a distant server for granting a user access through a user access device to a service coming from a set of services of a server application, wherein said distant server hosts said server application and is configured by means of said sever application to:
during a user session, receive a service access request from the user access device,
send to said user access device a user authentication request, a primary challenge, an URL of said service and a unique user identifier, to be forwarded by said user access device to a secure peripheral device to which it is logically connected to, said user access device acting as a gateway between said secure peripheral device and said distant server,
receive a primary response forwarded by said user access device and coming from said secure peripheral device, said primary response being based on a flag, on said primary challenge, and on a secret device key associated to said URL and which has been stored within said secure peripheral device during a user-device binding process, said flag being set up according to a checking of the user identity by said device application through said secure peripheral device using the result of a comparison between user data signals and the ones that have been stored within said secure peripheral device during a user-device binding process, or relying on a last user authentication validity if a period of time is not exceeded,
verify the validity of said primary response,
according to said primary response, grant or deny the user access to said service through said user access device.

There is also provided a secure peripheral device for checking a user identity for accessing a service through a user access device, said service coming from a set of services of a server application hosted by a distant server, wherein said secure peripheral device hosts a device application and is configured by means of said device application to:
receive from said user access device a user authentication request, a primary challenge, an URL of said service, and a unique user identifier, coming from said distant server, said user access device acting as a gateway between said distant server and said secure peripheral device to which it is logically connected to,
upon receiving said user authentication request, check the user identity,
build a flag according to said checking, using the result of a comparison between user data signals and the ones that have been stored within said secure peripheral device during the user-device binding process, or relying on a last user authentication if a period of time is not exceeded,
generate a primary response based on said flag, on said primary challenge and on a secret device key associated to a unique user identifier and to said URL and which has been stored within said secure peripheral device during a user-device binding process,
send back to said distant server through said user access device said primary response for verification of its validity by said distant server.

There is also provided a user access device for accessing a service coming from a set of services of a server application hosted by a distant server, wherein said user access device is acting as a gateway between said distant server and a secure peripheral device to which it is logically connected to, and hosts a client application and is configured by means of said client application to:
receive a service access request,
forward to said distant server said service access request,
forward to said secure peripheral device, a user authentication request, a primary challenge, an URL of said service, and a unique user identifier, coming from said distant server,
forward to said distant server a primary response coming from said secure peripheral device, said primary response being based on a flag, on said primary challenge, and on a secret device key associated to a unique user identifier and to said URL and which has been stored within said secure peripheral device during a user-device binding process, said flag being set up according to a checking of the user identity by said device application through said secure peripheral device using the result of a comparison between user data signals and the ones that have been stored within said secure peripheral device during a user-device binding process, or relying on a last user authentication validity if a period of time is not exceeded.

There is also provided a system for granting a user access through a user access device hosting a client application to a service coming from a set of services of a server application hosted by a distant server, wherein said system comprises said user access device, said distant server and a secure peripheral device to which said user access device is logically connected to, said secure peripheral device hosting a device application, and wherein:

said distant server is configured by means of said server application to:
during a user session, receive service access request from the user access device,
send a user authentication request, a primary challenge, an URL of said service, and a unique user identifier to said user access device to be forwarded to said secure peripheral device,
receive a primary response forwarded by said user access device and coming from said secure peripheral device, said primary response being based on a flag, on said primary challenge, and on a secret device key associated to said URL and which has been stored within said secure peripheral device during a user-device binding process, said flag being set up according to a checking by said device application through said secure peripheral device of the user identity using the result of a comparison between user data signals and the ones that have been stored within said secure peripheral device during a user-device binding process, or relying on a last user authentication validity if a period of time is not exceeded,
verify the validity of said primary response,
according to said primary response, grant or deny the user access to said service through said user access device,
said user access device is acting as a gateway between said secure peripheral device and said distant server, said user access device is configured by means of said client application to:
receive a service access request,
forward to said distant server said service access request,
forward to said secure peripheral device said user authentication request, said primary challenge, said URL, and said unique user identifier, coming from said distant server,
forward to said distant server said primary response coming from said secure peripheral device,
said secure peripheral device is configured by means of said device application to:
receive from said user access device said user authentication request, said primary challenge, said URL of said service, and said unique user identifier, coming from said distant server, said user access device acting as a gateway between said distant server and said secure peripheral device to which it is logically connected to,
upon receiving said user authentication request, check the user identity,—build a flag according to said checking using the result of a comparison between user data signals and the ones that have been stored within said secure peripheral device during the user-device binding process, or relying on a previous user authentication if a period of time is not exceeded,
generate said primary response based on said flag, on said primary challenge and on a secret device key associated to said unique user identifier and to said URL and which has been stored within said secure peripheral device during the user-device binding process,
send back to said user access device said primary response to be forwarded to said distant server.

When a user performs a login to a server application hosted by a distant server, but there is not yet a user session open, and he wants to access to a service of said server application through a user access device, a method for granting a user access to said service coming from a set of services of a server application hosted by a distant server, that is well-known by the man skilled in the art, comprises receiving the user access request by said server application through said distant server, making a remote API call from said server application to a third party server application to get a security authorization token of the user, receiving from said third party server application said security authorization token, and checking from said server application through said distant server said security authorization token.

One problem of this prior art is that the security authorization token is long lived which leads to a weak security. Moreover, as the API call is performed repeatedly (each time there is a user access request to a service coming from a set of services of the server application), a malevolent third party can break through the communication between said distant server and said third party distant server and get the security authorization token of the user.

It is an object of the invention to provide a method for granting a user access through a user access device hosting a client application to a service coming from a set of services of a server application hosted by a distant server, which resolves the problem above-stated.

To this end, it is provided a method for granting a user access through a user access device hosting a client application to a service coming from a set of services of a server application hosted by a distant server, said user access device being logically connected to a secure peripheral device hosting a device application, wherein said method comprises:

receiving by said device application through said secure peripheral device a service access request to said service, and forwarding it to said user access device,
sending back by said client application through said user access device a user authentication request, the URL of said service, and an unique user identifier,
upon receiving said user authentication request, checking by said device application through said secure peripheral device user identity,
building by said device application through said secure peripheral device a flag according to said checking using the result of a comparison between user data signals and the ones that have been stored within said secure peripheral device during a user-device binding process, or relying on a last user authentication validity if a period of time is not exceeded,
computing by said device application through said secure peripheral device a REST API call argument based on said flag, said URL, said unique user identifier, and a secret device key associated to a unique user identifier and to said URL and which has been stored within said secure peripheral device during the user-device binding process, and sending it to said user access device, making by said client application through said user access device a remote REST API call to said distant server with said API call argument, extracting by said server application through said distant server said REST API call argument from said REST API call, verifying by said server application through said distant server the validity of said REST API call argument based on said secret device key which has been stored within said distant server during the user-binding process, according to said verification, granting or denying by said server application through said distant server the user access to said service through said user access device.

As we will see in further details, the user identification is performed when the user wants to access a service of said server application when there is not yet a user session open. Hence, there is a continuous evaluation of what the user requests contrary to the prior art. The client application through said user access device can assert user identity when making a request to the server application. Hence, this method complies with the zero trust security model. Moreover, with the REST API call argument that is embedded within the REST API call, and because the REST API call argument comes directly from the device application through said secure peripheral device that is bind with the user, the distant server is confident that the REST API call is coming from a legitimate user.

According to non-limitative embodiments of the invention, the method in accordance with the invention further comprises the following characteristics.

In a non-limitative embodiment, said REST API call argument is further computed base on at least one stamp.

In a non-limitative embodiment, the user data signals are biometric data.

In a non-limitative embodiment, said secure peripheral device is a mouse or a keyboard with a fingerprint scanner, or a Smartphone with a fingerprint scanner or with a front camera.

In a non-limitative embodiment, if the last user authentication is not valid, the method further comprises the display of a primary message inviting the user to authenticate himself by inputting his user data signals through said secure peripheral device.

In a non-limitative embodiment, the secret device key is composed of an encryption key and of a message authentication code key, and the verifying of the validity of the REST API call argument is performed by:
  verifying its integrity using said message authentication code key
  verifying said flag.

In a non-limitative embodiment, said server application through said distant server grants or denies the user access to said service(S) through said user access device according also to security policies.

In a non-limitative embodiment, the user-device binding process comprises:
  receiving by said client application through said user access device a binding request comprising user credentials, and forwarding it to said distant server,
  verifying by said server application through said distant server said user credentials,
  computing by said server application through said distant server a primary hash based on one of said user credentials and said secret device key based on said URL, on said primary hash and on said unique user identifier, and storing said secret device key and said primary hash,
  sending back by said server application through said distant server said unique user identifier, said URL and a secondary challenge to said user access device,
  computing by said client application through said user access device a secondary hash based on said one of said user credential, and forwarding it with said unique user identifier, said URL, said secondary challenge to said secure peripheral device,
  displaying by said client application through said user access device instructions for the user to input user data signals for performing user enrollment,
  computing by said device application through said secure peripheral device said secret device key based on said URL, on said unique user identifier and said secondary hash, and store a mapping of said secret device key with the user data signals, said unique user identifier, and said URL,
  generating by said device application through said secure peripheral device a secondary response based on said secondary challenge and on said secret device key, and send it to said user access device that forwards it to said distant server,
  verifying by said server application through said distant server the validity of said secondary response,
  if said secondary response is valid, storing by said server application through said distant server a mapping of the secret device key with the unique user identifier and said URL.

In a non-limitative embodiment, the reception of said binding request is triggered when said distant server receives from said user access device a login request to a user account related to said application.

In a non-limitative embodiment, the user-device binding process further comprises:
  notifying by said server application through said distant server the completion of the user-device binding to said user access device that forwards it to said secure peripheral device,
  displaying by said client application through said user access device a secondary message indicating the completion of the user-device binding.

There is also provided a distant server for granting a user access a client application through a user access device hosting said client application to a service coming from a set of services of a server application, wherein said distant server hosts said server application and is configured by means of said server application to:
  upon receiving a REST API call with an API call argument from said user access device, extract said REST API call argument from said REST API call,
  verify the validity of said REST API call argument based on a secret device key which has been stored within said distant server during a user-binding process,
  according to said verification, grant or deny the user access to said service through said user access device.

There is also provided a secure peripheral device for checking a user identity for accessing a service through a user access device to which is it logically connected to, said service coming from a set of services of a server application hosted by a distant server, wherein said secure peripheral device hosts a device application and is configured by means of said device application to:
  receive a service access request to said service and forward it to said user access device, upon receiving from said user access device a user authentication request, an URL of said service, and an unique user identifier, check the user identity, build a flag according to said checking using the result of a comparison between user data signals and the ones that have been stored within said secure peripheral device during a user-device binding process, or relying on a last user authentication validity if a period of time is not exceeded, compute a REST API call argument based on said flag, said URL, said unique user identifier, and a secret device key associated to a unique user identifier and to said URL and which has been stored within said secure peripheral device during the user-device binding process, and send it to said user access device.

There is also provided a user access device for accessing a service coming from a set of services of a server application hosted by a distant server, wherein said user access device secure peripheral hosts a client application and is configured by means of said client application to:

upon receiving from said secure peripheral device to which it is logically connected to a service access request to said service, send back a user authentication request, the URL of said service, and an unique user identifier, receive from said secure peripheral device a REST API call argument, said REST API call argument being based on a flag, said URL, said unique user identifier, and a secret device key associated to a unique user identifier and to said URL and which has been stored within said secure peripheral device during a user-device binding process, said flag being built using the result of a comparison between user data signals and the ones that have been stored within said secure peripheral device during a user-device binding process, or relying on a last user authentication validity if a period of time is not exceeded, make a remote REST API call to said distant server with said API call argument.

There is also provided a system for granting a user access through a user access device hosting a client application to a service coming from a set of services of a server application hosted by a distant server, wherein said system comprises said user access device, said distant server and a secure peripheral device to which said user access device is logically connected to, said secure peripheral device hosting a device application, and wherein:

said secure peripheral device is configured to by means of said device application:

receive a service access request to said service and forward it to said user access device, upon receiving from said user access device a user authentication request, an URL of said service, and an unique user identifier, check the user identity, build a flag according to said checking using the result of a comparison between user data signals and the ones that have been stored within said secure peripheral device during a user-device binding process, or relying on a last user authentication validity if a period of time is not exceeded, compute a REST API call argument based on said flag, said URL, said unique user identifier, and a secret device key associated to a unique user identifier and to said URL and which has been stored within said secure peripheral device during the user-device binding process, and send it to said user access device, said user access device is configured to by means of said client application:

upon receiving from said secure peripheral device a service access request to said service, send back a user authentication request, the URL of said service, and an unique user identifier, receive from said secure peripheral device said REST API call argument, make a remote REST API call to said distant server with said API call argument, said distant server is configured to by means of said server application:

upon receiving a REST API call with an API call argument from said user access device, extract said REST API call argument from said REST API call, verify the validity of said REST API call argument based on a secret device key which has been stored within said distant server during a user-binding process, according to said verification, grant or deny the user access to said service through said user access device.

BRIEF DESCRIPTION OF THE DRAWINGS

Some embodiments of methods and/or system in accordance with embodiments of the present invention are now described, by way of example only, and with reference to the accompanying drawings, in which.

DETAILED DESCRIPTION

In the following description, well-known functions or constructions by the man skilled in the art are not described in detail since they would obscure the invention in unnecessary detail.

The present invention relates to a first method 1 for granting a user U1 access through a user access device CA hosting a client application A1 to a service S coming from a set ST of services S of a server application A2 hosted by a distant server SA, also called server SA in the following. Said first method 1 is described in reference to FIG. 1, according to a non-limitative embodiment. Said first method 1 is also called method 1 in the following. As we will see, in the first method 1, the server application A2 can trigger user identity verification during an ongoing application flow.

The present invention also relates to a second method 4 for granting a user U1 access through a user access device CA hosting a client application A1 to a service S coming from a set ST of services S of a server application A2 hosted by a distant server SA. Said second method 4 is described in reference to FIG. 5, according to a non-limitative embodiment. Said second method 4 is also called method 4 in the following. As we will see, in the second method 4, the client application A1 can trigger a remote REST API call to the server application A2 and confirm the user identity during a same application flow.

In the following, the following conventions are used:
E{x}y means encrypt x using y as key,
D{x}y means decrypt x using y as key,
M{x}y means create a keyed MAC of x using y as key,
A=f(B) means that A is a cryptographic one-way function of B. In a non-limitative example f is a pseudo-random function that converts B into a cryptographic key. B consists of multiple inputs.

Figure 4:
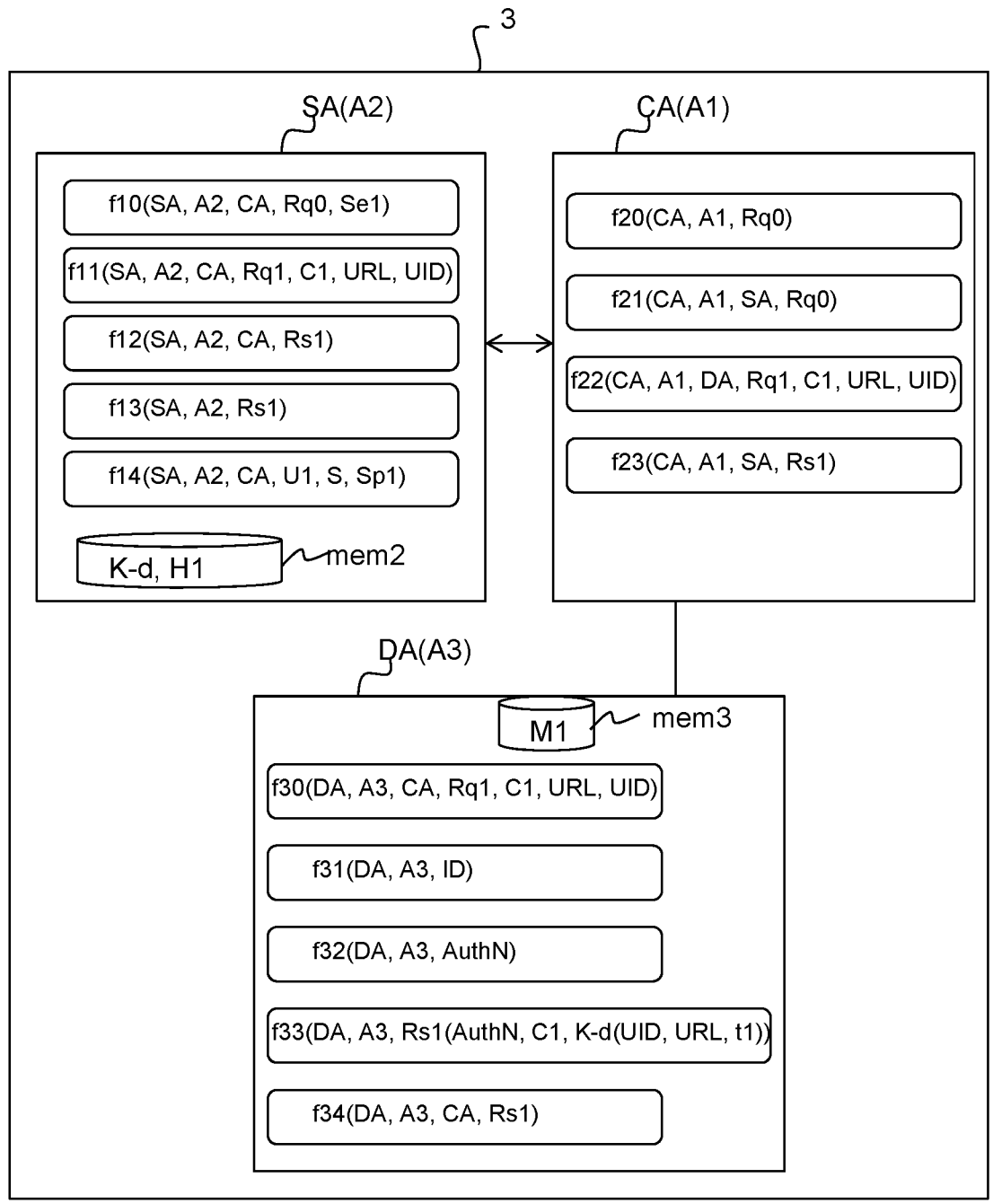
FIG. 4 is a schematic diagram which illustrates a first system that is configured to carry out the first method of FIG. 1, said first system comprising a user access device, a distant server and a secure peripheral device to which said user access device is logically connected to, according to a non-limitative embodiment.
Figure 6:
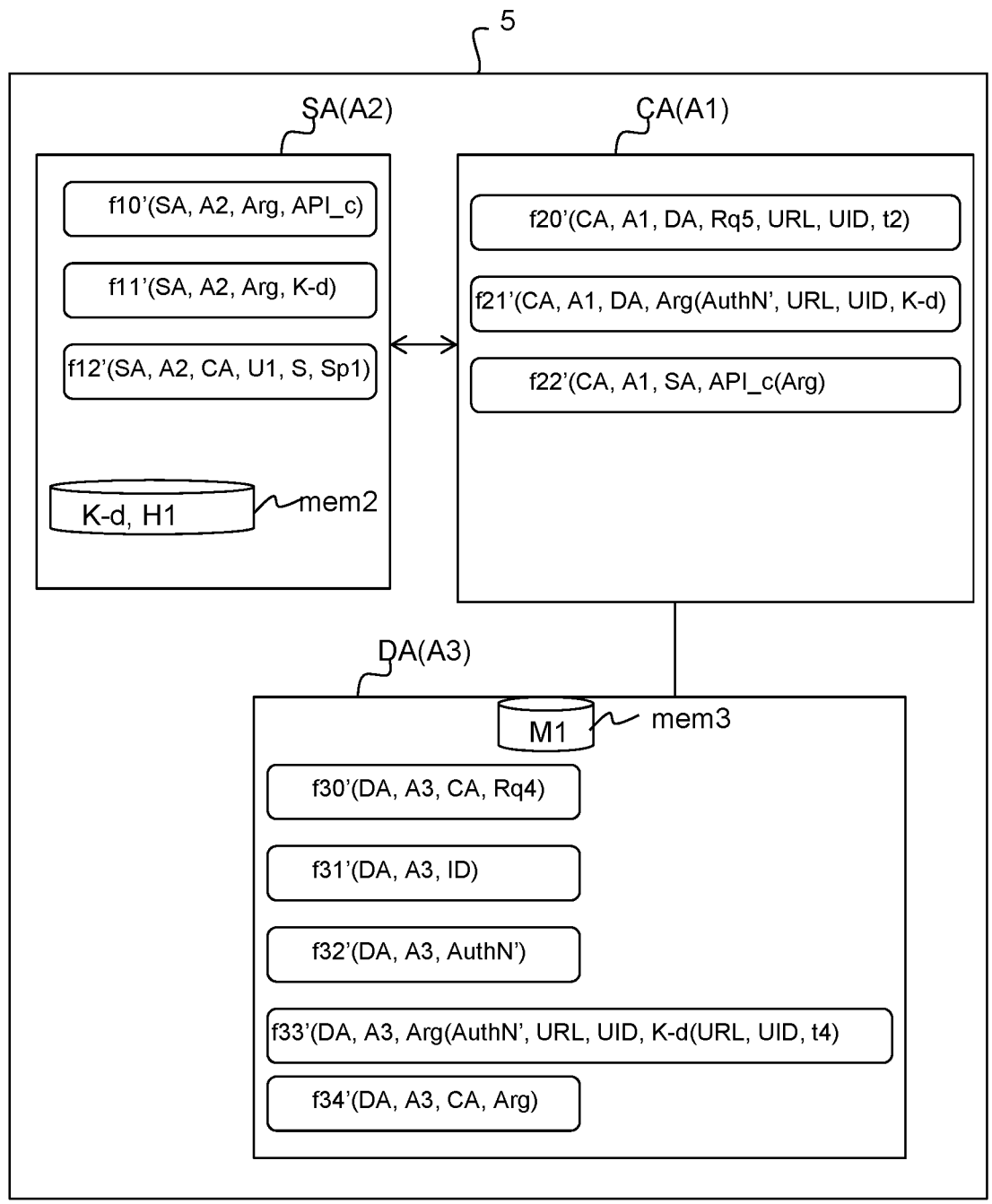
FIG. 6 is a schematic diagram which illustrates a second system that is configured to carry out the second method of FIG. 5, said second system comprising a user access device, a distant server and a secure peripheral device to which said user access device is logically connected to, according to a non-limitative embodiment.

The user access device CA and the distant server SA are illustrated in FIG. 4 and FIG. 6. In non-limitative embodiment, the user access device CA is a laptop, a computer, a Smartphone, a tablet, or any other device with an interface human machine. The client application A1 runs on the user access device CA and is downloaded from the distant server SA. In a non-limitative example, the client application A1 is a web browser on the laptop. It communicates both with the distant server SA and the secure peripheral device DA.

The server application A2 runs on the distant server SA. It drives how often, when and how user identity verification should be done in the first method 1.

The secure peripheral device DA is logically connected to said user access device CA. In non-limitative embodiments, the secure peripheral device DA is a mouse with fingerprint scanner, a keyboard with ultrasonic fingerprint scanner, a Smartphone with ultrasonic fingerprint scanner through the screen, a Smartphone with front camera. The user U1 interacts with the secure peripheral device DA. In a non-limitative embodiment, the secure peripheral device DA is a white label device. It means that it can be used to access any distant server SA indifferently contrary to a dedicated secure peripheral device DA which can talk to only one distant server SA. The secure peripheral device DA hosts a device application A3. The device application A3 runs on the secure peripheral device DA. The secure peripheral device DA has an end-2-end communication channel with the distant server SA. In a non-limitative example, the end-2-end communication channel is an http, or an https communication channel. Hence, the transport layer uses the user access device CA to connect to the distant server SA, but the user access device CA cannot peak into the payload (data pack) being sent via the http or https communication protocol. In a non-limitative embodiment, the user access device CA and the secure peripheral device DA are the same unit.

A user U1 or a plurality of users U1 can be associated to a secure peripheral device DA or to a plurality of secure peripheral devices DA through a user-binding process 20 described later. Hence, said association can be done in any of these three ways:
  1:1: one secure peripheral device DA is associated to one user U1,
  1:N: one secure peripheral device DA is associated to many users U1,
  N:1: many secure peripheral devices DA are associated to one user U1.

In the following, the user access device CA and the secure peripheral device DA are two different units, the mouse with fingerprint scanner is taken as a non-limitative example for the secure peripheral device DA, and the laptop is taken as a non-limitative example for the user access device CA.

When a user U1 wants to access a service S coming from a set ST of service S of the server application A2 hosted by the distant server SA, either he/she has already login to the server application A2 and a user session Se1 is open, either he/she has login but there is not yet a user session Se1 open. In a non-limitative example, the server application A2 is a banking application. To login, either the user U1 uses a user name u and password p, or a 2FA (Two-Factor Authentication) stronger authentication such as a user/password combined with an OTP ("One Time Password").

When a user session Se1 is already open, the first method 1 is executed. When there is no user session Se1 open, the second method 4 is executed. The first method 1 will be described first, and then the second method 4 will be described afterwards.

The first method 1 is described hereinafter.

When a user session Se1 is already open, that means that the user U1 has already connected to the banking application A2 in the non-limitative given example, and when the user U1 wants to access a service S within said banking application A2, he selects the corresponding URL with the client application A1 (here the web browser) by clicking on the mouse DA. In non-limitative examples, the service S for the banking application A2 is a money transfer service, a checking accounts service, a payweb card issuance service etc. In the following, a money transfer service is taken as a non-limitative example.

Figure 1:
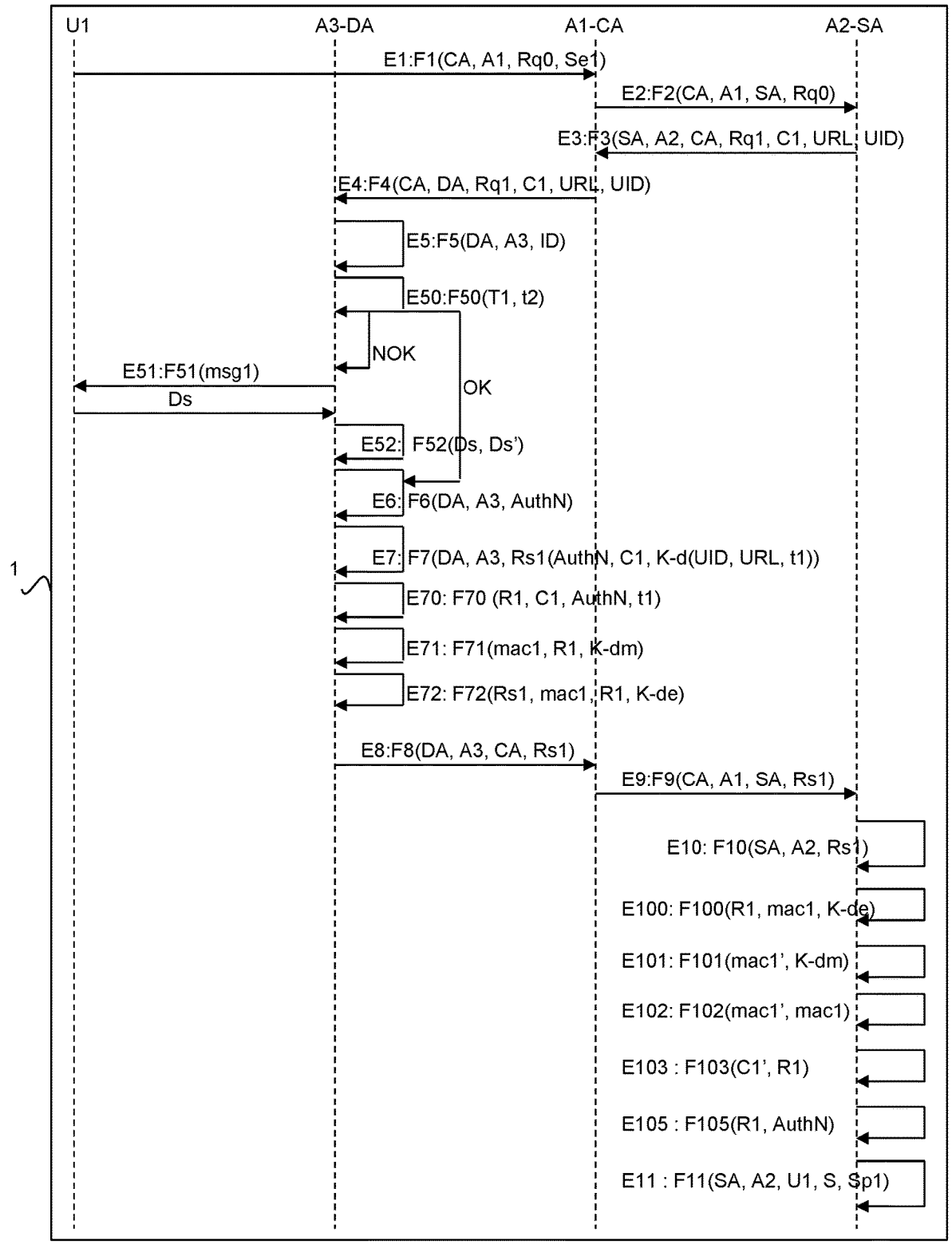
FIG. 1 is a schematic diagram which illustrates a first method for granting a user access through a user access device hosting a client application to a service coming from a set of services of a server application hosted by a distant server, according to a non-limitative embodiment of the invention.

The method 1 for granting the user U1 access to said service S comprises the following steps as illustrated in FIG. 1 in a non-limitative embodiment.

In step E1 (illustrated F1(CA, A1, Rq0, Se1)), during a user session Se1, the client application A1 receives through said user access device CA a service access request Rq0 and forwards it to the distant server SA (step E2 illustrated F2(CA, A1, SA, Rq0)). The service access request Rq0 is the request for accessing the money transfer service S in the non-limitative given example. The service access request Rq0 is triggered by the user U1 when he selects an URL of the service S. In a non-limitative embodiment, the forwarding is triggered by a left-click event in the non-limitative given example of the mouse DA. The service access request Rq0 comprises the URL of said service S.

In step E3 (illustrated F3(SA, A2, CA, Rq1, C1, URL, UID)), upon receiving said service access request Rq0, the server application A2 sends through said distant server SA to said user access device CA a user authentication request Rq1, a primary challenge C1, the URL of said service S, and the unique user identifier UID. The primary challenge C1 is a random nonce. That way, all information is self-contained. It is to be noted that if the URL is not sent, the user access device CA will have to keep track of this information and make an association between the service access request Rq0 and the user authentication request Rq1. It is to be noted that this user authentication request Rq1 depends on the server application A2 security policies Sp1. Depending of the service S, the server application A2 will ask for a user authentication or not. Hence, the server application A2 through the distant server SA triggers the user identity verification. In the non-limitative given example, it needs a user authentication to access to the money transfer service S. It is to be noted that the unique user identifier UID comes from the login request Rq3 when the user U1 performs a login.

In step E4 (illustrated in FIG. 1 F4(CA, DA, Rq1, C1, URL, UID)), the user access device CA forwards these data (user authentication request Rq1, primary challenge C1, URL of said service S, unique user identifier UID) to the secure peripheral device DA to which it is logically connected to. Hence, the user access device CA is acting as a gateway between said secure peripheral device DA and said distant server SA. It is to be noted that the URL of the service S can come from the distant server SA, or can be determined by the client application A1 (because the service access request Rq0 comprises the URL of said service S).

In step E5 (illustrated in FIG. 1 F5(DA, A3, ID)), the device application A3 checks through said secure peripheral device DA the user identity ID.

In non-limitative embodiment, the checking is based on the last user authentication validity, and in case on invalidity on user data signals Ds input on the secure peripheral device DA.

Hence, if a period of time T1 is not exceeded, the device application A3 assumes that the last user authentication is still valid and user authentication is not performed again. There is a timestamp t2 stored for each user authentication. Hence, the validity of the last user authentication is verified according to said timestamp t2 that has been transmitted from the distant server SA to the secure peripheral device DA when the user session Se1 has started. It is to be noted that the latest valid user authentication must have been done within the same user session Se1.

This period of time T1 can be defined as a part of security policies Sp1 of the server application A2 in order to avoid too much authentication in a row. In a non-limitative example, the period of time T1 is five minutes. Hence, the device application A3 checks with the timestamp t2 associated to the last user authentication, if the last user authentication is within these five minutes (step E50 illustrated F50(T1, t2)). If the last user authentication is still valid because the period of time T1 is not exceeded (branch OK), the step E6 is performed. If it is not valid because the period of time T1 is exceeded (branch NOK), the user authentication shall be verified again. Hence, in this later case, the device application A3 compares the user data signals Ds and the ones Ds' that have been stored within said secure peripheral device DA during a user-device binding process 20 (step E52 illustrated F52(Ds, Ds')). The user-device binding process 20, is described later in the description.

It is to be noted that the user data signals Ds are the data input by the user U1 on the secure peripheral device DA. In non-limitative embodiments, user data signals Ds are biometric data. In non-limitative examples, the biometric data are a fingerprint, a face, or the iris of an eye. The biometric data are direct signals as opposed to indirect signals such as an IP address.

It is to be noted that the need of user authentication is either notified to the user U1 by the device application A3 through the secure peripheral device DA, either it is not notified and it is done without the knowledge of the user U1 depending of the security policies Sp1 of the server application A2. Hence, the user identity verification is either forced, either silent. In the first case, when it is forced, in a non-limitative embodiment illustrated in FIG. 1, the method 1 further comprises the display (step E51 illustrated F51 (msg1)) by the device application A3 through the secure peripheral device DA of a primary message msg1 inviting the user U1 to authenticate himself by inputting his user data signals Ds through said secure peripheral device DA. It is done for example, when the iris of an eye is used, as the user U1 has to place his eye right in front of the camera of the Smartphone (if a Smartphone is used as a secure peripheral device DA) so that the device application A3 can capture correctly said user data signals Ds. The device application A3 waits the user U1 to input his user data signals Ds, and then performs the user authentication. In a non-limitative embodiment, the primary message msg1 is associated with a LED blinking, a sound, etc. In the second case, when it is not notified (it is silent), it means that the user data signals Ds are recovered automatically by the device application A3 without the knowledge of the user U1. It can be done for example, when the fingerprint is used. As the user U1 has always his finger on the mouse DA, and in particular on the fingerprint scanner of the mouse DA, it is assumed that the device application A3 can always capture correctly the user data signals Ds without asking the user U1.

In step E6 (illustrated in FIG. 1 F6(DA, A3, AuthN)), the device application A3 builds through said secure peripheral device DA a flag AuthN according to said checking. Hence, it uses the result of the comparison between user data signals Ds and the ones Ds' that have been stored within said secure peripheral device DA during the user-device binding process 20, or relies on the last user authentication validity if the period of time T1 is not exceeded. Hence, in a non-limitative example, if the user authentication is valid (Ds equal Ds' or the last user authentication is still valid), the flag AuthN is set to "true", and if not, it is set to "false". In a non-limitative embodiment, the values "true" and "false" are composed of a plurality of bits. In a non-limitative example, the value "true" is 55 and the value "false" is AA.

In step E7 (illustrated in FIG. 1 F7(DA, A3, Rs1(AuthN, C1, K-d(UID, URL), t1))), the device application A3 generates through said secure peripheral device DA a primary response Rs1 based on said flag AuthN, on said primary challenge C1, and on a secret device key K-d associated to the unique user identifier UID and to the URL of the service S. It is to be noted that said secret device key K-d has been stored within said secure peripheral device DA during the user-device binding process 20 described later. The device application A3 uses the URL of the service S and the unique user identifier UID to identify which secret device key K-d to use to build the primary response Rs1. It is to be noted that a malevolent third party can't know if the user authentication is correct or not as the primary response Rs1 is built up with the flag AuthN, even if this later is set up to "false" and is transmitted to said distant server SA even in this case through the user access device CA.

It is to be noted that the secure peripheral device DA has stored in a memory a mapping M1 for these data during the user-device binding process 20: URL, UID, K-d, user data signal Ds. As the secure peripheral device DA can have multiple users U1, the UID in the mapping M1 allows the secure peripheral device DA to know which user U1 is using the secure peripheral device DA. The URL in the mapping M1 allows the secure peripheral device DA to perform authentication to multiple distant servers SA, and in particular to multiple services S on multiple distant servers SA. Hence, the UID and the URL allow the secure peripheral device DA to identify the credentials, that is to say which secret device key K-d, to use for the user authentication.

In a non-limitative embodiment, the primary response Rs1 is further generated based on at least one stamp t1 for diversification. In non-limitative examples, said stamp t1 is a timestamp or an incremental counter. The timestamp indicates the time when the primary response Rs1 has been built. Hence, the primary response Rs1 has a time validity. If the distant server SA is requesting a user authentication, the primary response Rs1 cannot be accepted by the distant server SA if it is received two hours later for example. In this case, the user authentication is discarded because of being too old. The timestamp and the incremental counter avoid user authentication replay attacks by a malevolent third party.

The secret device key K-d is composed of an encryption key K-de and of a message authentication code key K-dm, also called MAC key K-dm. In a first non-limitative embodiment illustrated, the primary response Rs1 is composed of a cryptogram that is the encryption of C1 using the encryption key K-de and these data are signed with the authentication code key K-dm. Additionally, in a non-limitative variant of embodiment, the at least one stamp t1 is used.

Hence, the following operations are performed to compute the primary response Rs1:

E70 (illustrated F70(R1, C1, AuthN, t1)): R1=C1+AuthN+t1,

E71(illustrated F71(mac1, R1, K-dm)): mac1=M{R1}K-dm

E72 (illustrated F72(Rs1, mac1, R1, K-de)): Rs1=E{R1, mac1}K-de

Alternatively, in a second non-limitative embodiment not illustrated, the mac1 can be outside the encrypted data. In this case, the primary response Rs1 is computed as: Rs1=E{R1}K-de+M{E{R1}K-de}K-dm.

In step E8 (illustrated in FIG. 1 F8(DA, A3, CA, Rs1)), the device application A3 sends back through said secure peripheral device DA said primary response Rs1 to said user access device CA that forwards it to said distant server SA in step E9 (illustrated F9(CA, A1, SA, Rs1)). Here again, the user access device CA acts as a gateway between the secure peripheral device DA and the distant server SA.

In step E10 (illustrated in FIG. 1 F10(SA, A2, Rs1)), upon receiving said primary response Rs1, the server application A2 through said distant server SA verifies the validity of the primary response Rs1. The server application A2 verifies the validity of the primary response Rs1 by verifying the integrity using the authentication code key K-dm and deciphering a primary cryptogram C1' using the encryption key K-de and compare it to the primary challenge C1. Hence, the following operations are performed:

E100 (illustrated in FIG. 1 F100(R1, mac1, K-de)): R1, mac1=D{Rs1}K-de,

E101 (illustrated in FIG. 1 F101(mac1', K-dm)): mac1'=M{R1}K-dm,

E102 (illustrated in FIG. 1 F102(mac1', mac1)): compare mac1' with mac1

E103 (illustrated in FIG. 1 F103(C1', R1)): C1' extracted from R1 and compare the primary cryptogram C1' with the primary challenge C1 stored locally in the distant server SA for this user session Se1. If both mac1' and C1' match respectively mac1 and C1, the verification of the primary response Rs1 is successful. The comparison of the mac1' with mac1 permits the checking of the integrity of the primary response Rs1.

E105 (illustrated in FIG. 1 F105(R1, AuthN)): extract AuthN from R1 and verifies if the value is set to "True".

In step E11 (illustrated in FIG. 1 F11(SA, A2, U1, S, Sp1)), according to said primary response Rs1, said server application A2 through said distant server SA grants or denies the user U1 access to said service S through said user access device CA. Hence, if the primary response Rs1 is valid, it means that the user authentication is valid, and the server application A2 grants the access to the service S, here the money transfer service in the non-limitative given example. If not, it denies the access. Hence, it denies the user U1 access to said service S if:

mac1' differs from mac1, or

C1' differs from C1, or

AuthN is set to "False.

In a non-limitative embodiment illustrated in FIG. 1, said server application A2 through said distant server SA grants or denies the user U1 access to said service S through said user access device CA according also to security policies Sp1. Indeed, it is to be noted that depending of the user U1 and of the service S requested, it is not because the user authentication is valid that the distant server SA is mandate to always grant the access to the service S for this user U1. The distant server SA may have some restrictions like white list or black list of users U1 that have the right to use the service S. Furthermore, all the services S may not be accessible by one user U1. These information are registered at the distant server SA level as the security policies Sp1. It may exists more open security policies like if the user U1 is authenticated, he can access to everything. Hence, in a non-limitative embodiment, the grant or deny is further based on the security policies Sp1 associated to said unique user identifier UID for each service S. If the access service access request Rq0 is in line with the security policies Sp1 of the server application A2, the access is granted, otherwise the server application A2 rejects the access.

The user-device binding process 20 is now described in the following according to FIG. 2 and FIG. 3. The user-device binding process 20 allows the binding between a user and a secure peripheral device DA.

Figure 2:
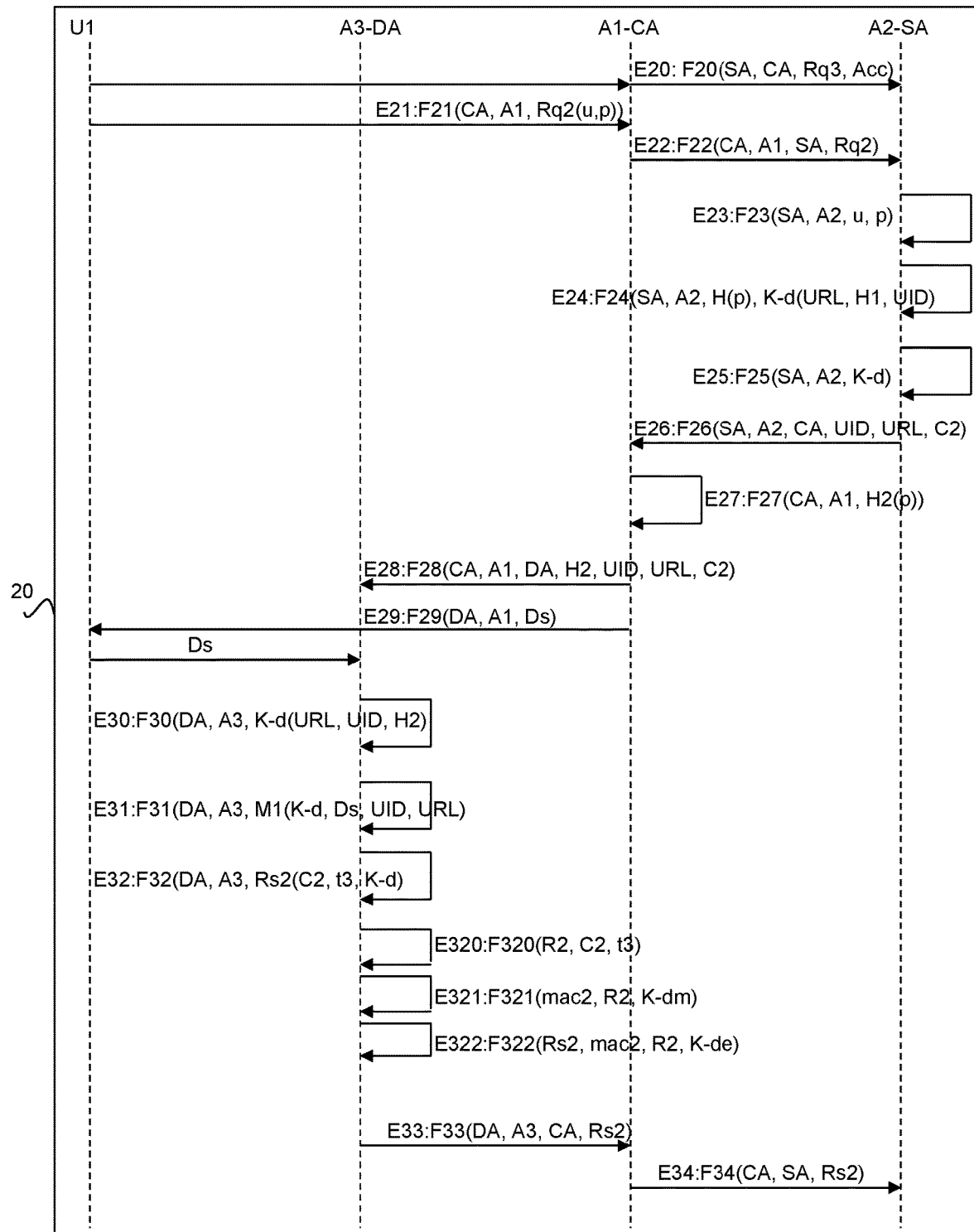
FIG. 2 is a schematic diagram of a user-binding process which result is used by the first method of FIG. 1, according to a non-limitative embodiment.

In step E21 (illustrated in FIG. 2 F21(CA, A1, Rq2(u,p))), the client application A1 (the web browser in the non-limitative given example) through said user access device CA receives a binding request Rq2 comprising user credentials u, p and forwards it to said distant server SA (step E22 illustrated F22(CA, A1, SA, Rq2)). In a non-limitative embodiment, the credentials u, p are the user name u and password p. In a non-limitative embodiment, the binding request Rq2 is triggered when said server application A2 through said distant server SA receives from said user access device CA a login request Rq3 to a user account Acc related to said server application A2 (step E20 illustrated F20(SA, CA, Rq3, Acc)). Hence, it is triggered when the user U1 wants to access his account Acc to the banking application A2 on the distant server SA of his bank in the non-limitative given example. The user U1 enters his user name u and his password p through the user access device CA. He has login.

In step E23 (illustrated in FIG. 2 F23(SA, A2, u, p)), the server application A2 through said distant server SA verifies said user credentials u,p. If the credentials u, p, are invalid, the user-device binding process 20 stops. If there are valid, the next step is performs.

In step E24 (illustrated F24(SA, A2, H(p), K-d(URL, H1, UID)), the server application A2 through said distant server SA computes a primary hash H1 based on one of the user credentials (here based on the password p in a non-limitative example). It also computes the secret device key K-d based on the URL of the service S, on the primary hash H1 and on the unique user identifier UID. It is to be noted that the unique user identifier UID comes from the login request Rq3 when the user U1 performs a login. Hence it is either the username u, either based on said username u.

The primary hash H1 is used in key derivation, both on the distant server's side and the user access device's side. In a non-limitative embodiment, H1=SHA-256(p). As described later, the secret device key K-d will be computed independently by the secure peripheral device DA using the same input parameters, thereby establishing a shared secret between the secure peripheral device DA and the distant server SA. As above-mentioned, the secret device key K-d is composed of two parts, the encryption key K-de and the message authentication code (MAC) key K-dm. Hence, the following operation is performed to compute the secret device key K-d: K-d=f(UID, URL, H1). In a non-limitative example f is a pseudo-random function. The secret device key K-d is composed of 64 bytes where K-de is composed of the first 32 bytes of K-d and K-dm is composed of the last 32 bytes of K-d. The input parameters are UID, the unique user identifier UID which can be the user name u in a non-limitative example, the URL of the service S or of the server application A2, and H1 the primary hash of password computed in the non-limitative given example.

In step E25 (illustrated in FIG. 2 F25(SA, A2, K-d)), the server application A2 through said distant server SA stores the secret device key K-d and the primary hash H1 in a memory mem2. In non-limitative embodiments, the memory mem2 is an EPROM, an EEPROM, or a flash memory.

In step E26 (illustrated in FIG. 2 F26(SA, A2, CA, UID, URL, C2)), the server application A2 through said distant server SA initiates the user-device binding by sending back said unique user identifier UID, said URL and a secondary challenge C2 to said user access device CA. The secondary challenge C2 is a random nonce.

In step 27 (illustrated in FIG. 2 F27(CA, A1, H2(p)), said client application A1 through said user access device CA computes a secondary hash H2 based on said one of said user credential p. In a non-limitative embodiment, H2=SHA-256(p). It is to be noted that the user access device CA has the credentials u,p of the user U1 as this latter has entered his credentials u,p when he has login onto the banking application A2 in the non-limitative given example.

In step E28 (illustrated in FIG. 2 F28(CA, A1, DA, H2, UID, URL, C2)) said user access device CA forwards the secondary hash H2, the unique user identifier UID, the URL, and the secondary challenge C2 to the secure peripheral device DA. This is indication to the secure peripheral device DA that user-device binding has been initiated and that the user U1 has to present his user data signals Ds, here his fingerprint in the non-limitative given example.

In step 29 (illustrated in FIG. 2 F29(DA, A1, Ds)), said client application A1 displays through said user access device CA instructions for the user U1 to input user data signals Ds for performing user enrollment.

When the user U1 has input his fingerprint Ds for the user enrollment, in step E30 (illustrated in FIG. 2 F30(DA, A3, K-d(URL, UID, H2), the device application A3 through said secure peripheral device DA computes in turn the secret device key K-d. The computation is the same as performed by the server application A2 as above-described.

In step E31 (illustrated in FIG. 2 F31(DA, A3, M1(K-d, Ds, UID, URL)), the device application A3 through said secure peripheral device DA stores a mapping M1 of said secret device key K-d with said user data signals Ds, said unique user identifier UID, and said URL, in a memory mem3. In non-limitative embodiments, the memory mem3 is an EPROM, an EEPROM, or a flash memory.

Hence, the mapping allows to have the association above-described:

1:1: one secure peripheral device DA is associated to one user U1,

1:N: one secure peripheral device DA is associated to many users U1,

N:1: many secure peripheral devices DA are associated to one user U1.

In step E32 (illustrated in FIG. 2 F32(DA, A3, Rs2(C2, t3, K-d)), the device application A3 through said secure peripheral device DA generates a secondary response Rs2 based on said secondary challenge C2 and on said secret device key K-d. In a non-limitative embodiment illustrated, the secondary response Rs2 is generated based further on at least one stamp t3 for diversification. In non-limitative examples, said stamp t3 is a timestamp or an incremental counter. The timestamp indicates the time when the secondary response Rs2 has been built. The timestamp and the incremental counter avoid replay attacks by a malevolent third party.

In a first non-limitative embodiment illustrated, the secondary response Rs2 is composed of a cryptogram that is the encryption of C2 using the encryption key K-de and these data are signed with the authentication code key K-dm. Additionally, in a non-limitative variant of embodiment, the stamp t3 is used.

Hence, the following operations are performed to compute the secondary response Rs2 to the secondary challenge C2:

E320 (illustrated F320(R2, C2, t3)): R2=C2+t3,
E321 (illustrated F321(mac2, R2, K-dm)): mac2=M{R2}K-dm
E322 (illustrated F322(Rs2, mac2, R2, K-de)): Rs2=E{R2, mac2}K-de Alternatively, in a second non-limitative embodiment not illustrated, the mac2 can be outside the encrypted data. In this case, the secondary response Rs2 is computed as: Rs2=E{C2+t3}K-de+M{E{C2+t3}K-de}K-dm.

In step E33 (illustrated in FIG. 2 F33(DA, A3, CA, Rs2)), the device application A3 through said secure peripheral device DA sends the secondary response Rs2 to the user access device CA that forwards it (step E34 illustrated in FIG. 2 F34 (CA, SA, Rs2)) to the distant server SA.

Figure 3:
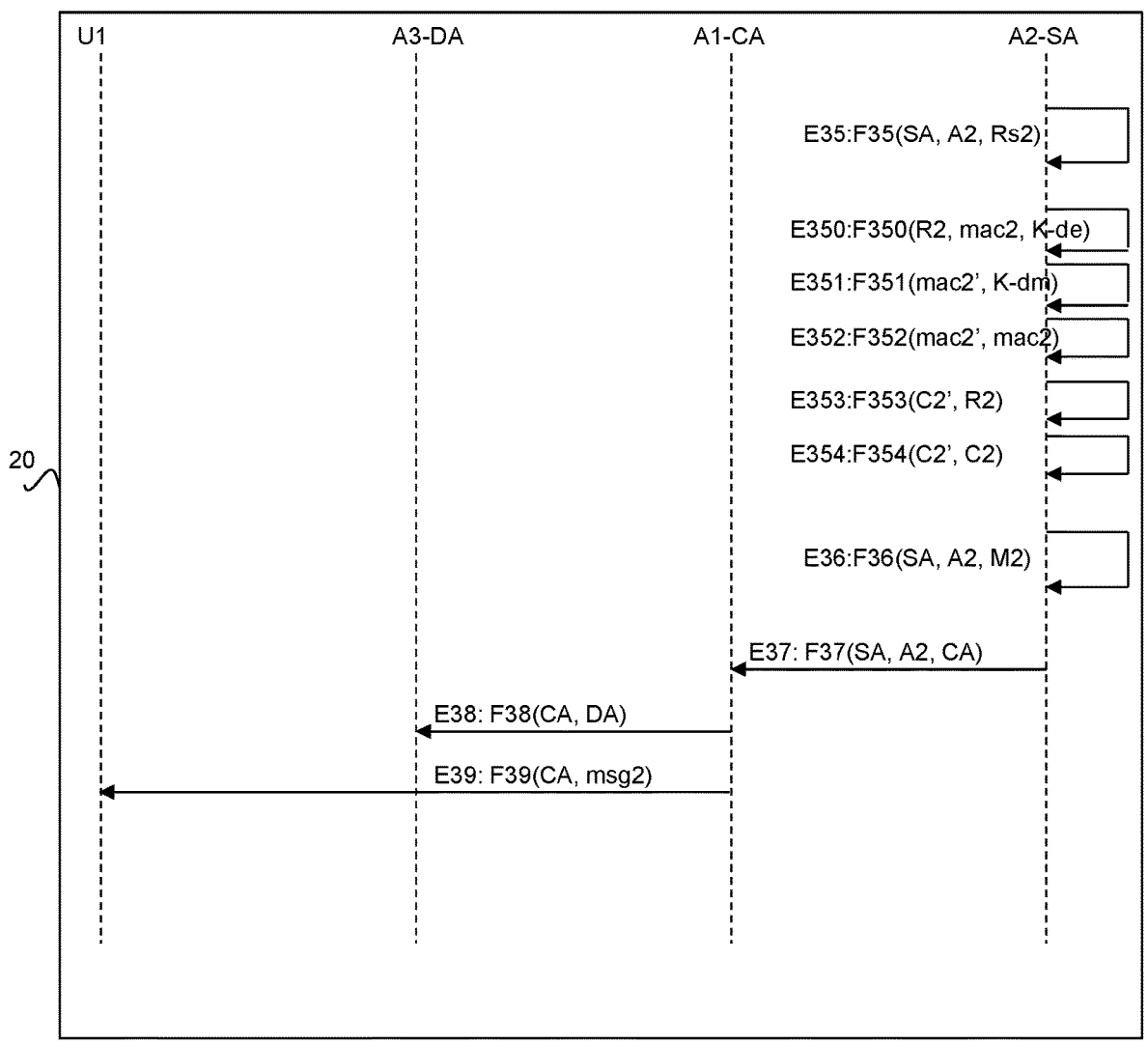
FIG. 3 is the continuation of the steps of the user-binding process of FIG. 2, according to a non-limitative embodiment.

In step E35 (illustrated in FIG. 3 F35(SA, A2, Rs2)), the server application A2 through said distant server SA verifies the validity of said secondary response Rs2. The server application A2 verifies the validity of the secondary responses Rs2 by verifying the integrity using the authentication code key K-dm and deciphering a secondary cryptogram C2' using the encryption key K-de and compare it to the secondary challenge C2. Hence, the following operations are performed:

E350 (illustrated F350(R2, mac2, K-de)): R2, mac2=D{Rs2}K-de,

E351 (illustrated F351 (mac2', K-dm)): mac2'=M{R2}K-dm,

E352 (illustrated F352(mac2', mac2)): compare mac2' with mac2,-E353 (illustrated F353(C2', R2)): C2' extracted from R2-E354 (illustrated F354(C2', C2)): compare the secondary cryptogram C2' with the secondary challenge C2 stored locally in the distant server SA for this user session Se1. If both mac2' and C2' match respectively mac2 and C2, the verification of the secondary response Rs2 is successful.

In step E36 (illustrated in FIG. 3 F36(SA, A2, M2)), if the secondary response Rs2 is valid, the server application A2 through said distant server SA stores the mapping M2 of the secret device key K-d with the unique user identifier UID and the URL in the memory mem2. The identity of the user U1 can be therefore verified by proof of possession of the secret device key K-d on the secure peripheral device DA. If the secondary response Rs2 is invalid, the secret device key K-d is not bound to the unique user identifier UID. There is no mapping. It is up to the client application A1 to display a message to the user U1 to try again. Hence, in a non-limitative embodiment, if the secondary response Rs2 is invalid, the client application A1 displays again through said user access device CA instructions for the user U1 to input user data signals Ds for performing user enrollment.

In a non-limitative embodiment illustrated in FIG. 3, the user-device binding process 20 further comprises the following step. In step E37 (illustrated F37(SA, A2, CA)), said server application A2 through said distant server SA notifies the completion of the user-device binding to said user access device CA that forwards it (step E38 illustrated F38(CA, DA)) to said secure peripheral device DA.

In a non-limitative embodiment illustrated in FIG. 3, the user-device binding process further comprises the following step. In step E39 (illustrated F39(CA, msg2)), the client application A1 through said user access device CA displays a secondary message msg2 indicating the completion of the user-device binding. Hence, the user U1 is informed that the user-device binding process 20 is done and is successful.

Hence, the first method 1 is carried out by a first system 3 for granting a user U1 access through the user access device CA hosting a client application A1 to a service S coming from a set ST of services S of the server application A2 hosted by the distant server SA, wherein said first system 3 comprises said user access device CA, said distant server SA and a secure peripheral device DA to which said user access device CA is logically connected to, said secure peripheral device DA hosting the device application A3. Said first system 3 is also called system 3 in the following. Said system 3 is illustrated in FIG. 4.

Hence, the distant server SA is configured by means of said server application A2 to:

during a user session Se1, receive a service access request Rq0 from the user access device CA (function illustrated f10(SA, A2, CA, Rq0, Se1)), upon receiving said service access request Rq0, send a user authentication request Rq1, a primary challenge C1, an URL of said service S, and a unique user identifier UID to said user access device CA to be forwarded to said secure peripheral device DA (function illustrated f11 (SA, A2, CA, Rq1, C1, URL, UID)), receive a primary response Rs1 forwarded by said user access device CA and coming from said secure peripheral device DA (function illustrated f12(SA, A2, CA, Rs1)), verify the validity of said primary response Rs1 (function illustrated f13(SA, A2, Rs1)), according to said primary response Rs1, grant or deny the user U1 access to said service S through said user access device CA (function illustrated f14(SA, A2, CA, U1, S, Sp1)).

The distant server SA is further configured by means of said server application A2 to perform the steps of the binding process 20.

The user access device CA is acting as a gateway between said secure peripheral device DA and said distant server SA. Hence, the user access device CA is configured by means of said client application A1 to:

receive a service access request Rq0 (function illustrated f20(CA, A1, Rq0)), forward to said distant server SA said service access request Rq0 (function illustrated f21(CA, A1, SA, Rq0)), forward to said secure peripheral device DA the following data coming from said distant server SA: the user authentication request Rq1, the primary challenge C1, the URL, and the unique user identifier UID (function illustrated f22(CA, A1, DA, Rq1, C1, URL, UID)), forward to said distant server SA the primary response Rs1 coming from said secure peripheral device DA (function illustrated f23(CA, A1, SA, Rs1)).

The user access device CA is further configured by means of said client application A1 to perform the steps of the binding process 20.

Finally, the secure peripheral device DA is configured by means of said device application A3 to:

receive from said user access device CA the following data coming from the distant server SA: the user authentication request Rq1, the primary challenge C1, the URL of said service S, and the unique user identifier UID (function illustrated f30(DA, A3, CA, Rq1, C1, URL, UID)), upon receiving said user authentication request Rq1, check the user identity ID (function illustrated f31 (DA, A3, ID)), build the flag AuthN according to said checking using the result of a comparison between user data signals Ds and the ones Ds' that have been stored within said secure peripheral device DA during the user-device binding process 20, or relying on a last user authentication if a period of time T1 is not exceeded (function illustrated f32(DA, A3, AuthN)), generate said primary response Rs1 based on said flag AuthN, on said primary challenge C1 and on a secret device key K-d associated to said unique user identifier UID and to said URL and which has been stored within said secure peripheral device DA during the user-device binding process 20, (function illustrated f33(DA, A3, Rs1 (AuthN, C1, K-d(UID, URL, t1))), send back to said user access device CA said primary response Rs1 to be forwarded to said distant server SA (function illustrated f34(DA, A3, CA, Rs1)).

The secure peripheral device DA is further configured by means of said device application A3 to perform the steps of the binding process 20.

Now, the second method 4 is described hereinafter according to FIG. 5.

When a user session Se1 is not open, that means that the user U1 has not yet connected to the banking application A2 in the non-limitative given example. When the user U1 wants to access a service S within said banking application A2, he selects the corresponding URL with the client application A1 (here the web browser) by clicking on the mouse DA. In non-limitative examples, the service S for a banking application is a money transfer service, a checking accounts service, a payweb card issuance service etc. In the following, a money transfer service is taken as a non-limitative example.

Figure 5:
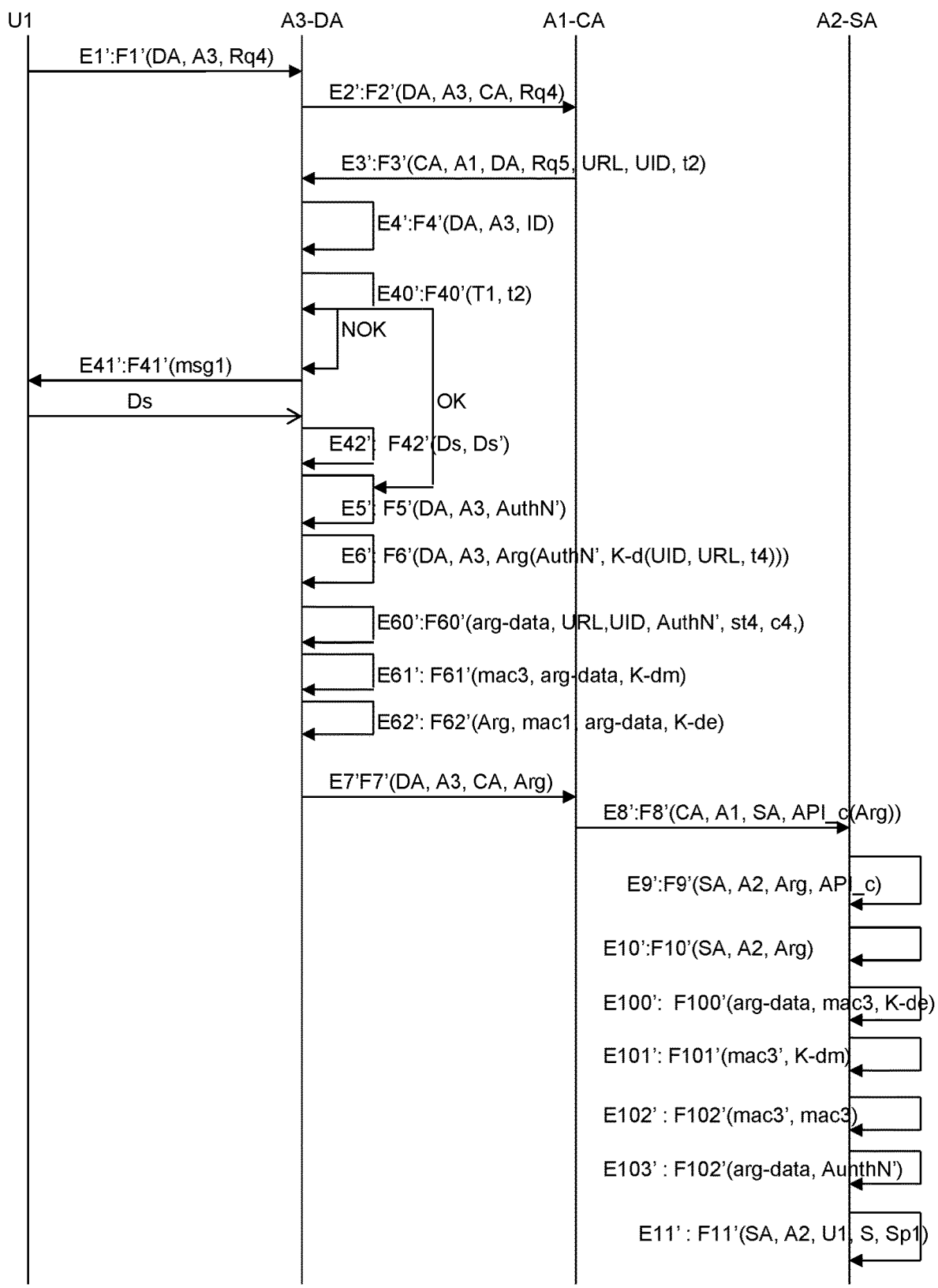
FIG. 5 is a schematic diagram which illustrates a second method for granting a user access through a user access device hosting a client application to a service coming from a set of services of a server application hosted by a distant server, according to a non-limitative embodiment of the invention.

The method 4 for granting the user U1 access to said service S comprises the following steps as illustrated in FIG. 5 in a non-limitative embodiment.

In step E1' (illustrated F1'(DA, A3, Rq4)), the device application A3 through said secure peripheral device DA receives a service access request Rq4 to said service S and forwards it to said user access device CA to which it is logically connected to (step E2' illustrated F2'(DA, A3, CA, Rq4)). The service access request Rq4 comprises an URL of said service S. The service access request Rq4 is the request for accessing the money transfer service S in the non-limitative given example. The service access request Rq4 is triggered by the user U1 when he selects an URL of the service S. In a non-limitative embodiment, the forwarding is triggered by a left-click event in the non-limitative given example of the mouse DA.

In step E3' (illustrated F3'(CA, A1, DA, Rq5, URL, UID, t2)), upon receiving said service access request Rq4, the client application A1 through said user access device CA sends back a user authentication request Rq5, the URL of said service S, an unique user identifier UID, and a timestamp t2. That way, all information is self-contained. It is to be noted that if the URL is not sent, the secure peripheral device DA will have to keep track of this information and make an association between the service access request Rq4 and the user authentication request Rq5. It is to be noted that in a first case, the unique user identifier UID can be obtained from the user when he/she logins with his/her username, username corresponding in this case to the unique user identifier UID. The unique user identifier UID picked up is based on the username u. In another second case, the unique user identifier UID can be cached in the user access device CA: it means that there has been an initial configuration between the user access device CA and the distant server SA with the corresponding match URL-UID. Indeed, the user access device CA has to know where to make the REST API call.

In step E4' (illustrated in FIG. 1 F4'(DA, A3, ID)), the device application A3 through said secure peripheral device DA checks the user identity ID.

In non-limitative embodiment, the checking is based on the last user authentication validity, and in case on invalidity on user data signals Ds input on the secure peripheral device DA.

Hence, if a period of time T1 is not exceeded, the device application A3 assumes that the last user authentication is still valid and user authentication is not performed again. There is a timestamp t2 stored for each user authentication. Hence, the validity of the last user authentication is verified according to said timestamp t2 transmitted from the user access device CA to the secure peripheral device DA.

This period of time T1 can be defined as a part of security policies Sp1 of the server application A2 in order to avoid too much authentication in a row. In a non-limitative example, the period of time T1 is five minutes. Hence, the device application A3 checks with the timestamp t2 associated to the last user authentication, if the last user authentication is within these five minutes (step E40' illustrated F40'(T1, t2). If the last user authentication is still valid because the period of time T1 is not exceeded (branch OK), the step E5' is performed. If it is not valid because the period of time T1 is exceeded (branch NOK), the user authentication shall be verified again. Hence, in this later case, the device application A3 compares the user data signals Ds and the ones Ds' that have been stored within said secure peripheral device DA during the user-device binding process 20 (step E42' illustrated F42'(Ds, Ds')). The user-device binding process 20, is the one above-described in the description according to FIG. 2 and FIG. 3. Hence, the above-description of the user-device binding process 20 also applied for the second method 4.

It is to be noted that the user data signals Ds are the one input by the user U1 on the secure peripheral device DA. In non-limitative embodiments, user data signals Ds are biometric data. In non-limitative examples, the biometric data are a fingerprint, a face, or the iris of an eye.

It is to be noted that the need of user authentication is either notified to the user U1 by the device application A3 through the secure peripheral device DA, either it is not notified and it is done without the knowledge of the user U1 depending of the security policies Sp1 of the server application A2. Hence, the user identity verification is either forced, either silent. In the first case, when it is forced, in a non-limitative embodiment illustrated in FIG. 5, the method 1 further comprises the display (step E41' illustrated F41' (msg1)) by the device application A3 through the secure peripheral device DA of a primary message msg1 inviting the user U1 to authenticate himself by inputting his user data signals Ds through said secure peripheral device DA. It is done for example, when the iris of an eye is used, as the user U1 has to place his eye right in front of the camera of the Smartphone (if a Smartphone is used as a secure peripheral device DA) so that the device application A3 can capture correctly said user data signals Ds. The device application A3 waits the user U1 to input his user data signals Ds, and then performs the user authentication. In a non-limitative embodiment, the primary message msg1 is associated with a LED blinking, a sound, etc. In the second case, when it is not notified (it is silent), it means that the user data signals Ds are recovered automatically by the device application A3 without the knowledge of the user U1. It can be done for example, when the fingerprint is used. As the user U1 has always his finger on the mouse DA, and in particular on the fingerprint scanner of the mouse DA, it is assumed that the device application A3 can always capture correctly the user data signals Ds without asking the user U1.

In step E5' (illustrated in FIG. 1 F5'(DA, A3, AuthN')), the device application A3 builds through said secure peripheral device DA a flag AuthN' according to said checking. Hence, it uses the result of the comparison between user data signals Ds and the ones Ds' that have been stored within said secure peripheral device DA during the user-device binding process 20, or relies on the last user authentication validity if a period of time T1 is not exceeded. Hence, in a non-limitative example, if the user authentication is valid (Ds equal Ds' or the last user authentication is still valid), the flag AuthN' is set to "true", and if not, it set to "false".

In step E6' (illustrated in FIG. 1 F6'(DA, A3, Arg(AuthN', K-d(UID, URL), t4))), the device application A3 through said secure peripheral device DA computes a REST API call argument Arg based on said flag AuthN', said URL, said unique user identifier UID, and a secret device key K-d associated to a unique user identifier UID and to said URL and which has been stored within said secure peripheral device DA during the user-device binding process 20, and sends it to said user access device CA in step E7' (illustrated F7'(DA, A3, CA, Arg)). When it sends the REST API call argument Arg to the user access device CA, it means that it asks the client application A1 to build the REST API call API_c with said REST API call argument Arg.

The device application A3 uses the URL of the service S and the unique user identifier UID to identify which secret device key K-d to use to compute the REST API call argument Arg. It is to be noted that a malevolent third party can't know if the user authentication is correct or not as the REST API call argument Arg is built up with the flag AuthN, even if this later is set up to "false" and is transmitted to said distant server SA even in this case through a remote REST_API call API_c.

It is to be noted that the secure peripheral device DA has stored in memory a mapping M1 for these data: URL, UID, K-d, user data signal Ds. As the secure peripheral device DA can have multiple users U1, the UID in the mapping M1 it allows the secure peripheral device DA to know which user U1 is using the secure peripheral device DA. The URL in the mapping M1 allows the secure peripheral device DA to perform authentication to multiple distant servers SA, and in particular to multiple services S on multiple distant servers SA. Hence, the UID and the URL allow the secure peripheral device DA to identify the credentials, that is to say which secret device key K-d, to use for the user authentication.

In a non-limitative embodiment illustrated in FIG. 5, the REST API call argument Arg is further generated based on at least one stamp t4 for diversification. In non-limitative examples, said stamp t4 is a timestamp st4 or an incremental counter c4. The timestamp st4 indicates the time when the REST API call argument Arg has been built. Hence, the REST API call argument Arg has a time validity. If the user access device CA is requesting a user authentication, the REST API call argument Arg cannot be accepted by the user access device CA if it is received two hours later for example. In this case, the user authentication is discarded because of being too old. The timestamp st4 and the incremental counter c4 avoid replay attacks of an old service access request Rq4 by a malevolent third party.

The secret device key K-d is composed of an encryption key K-de and of a message authentication code key K-dm, also called MAC key K-dm. In a non-limitative embodiment illustrated, the REST API call argument Arg is composed of a cryptogram that is the encryption of some data with the encryption key K-de part of which (arg-data) have been signed with the authentication code key K-dm. The arg-data comprise the URL and the unique user identifier UID. Additionally, in a non-limitative variant of embodiment, the arg-data comprise the at least one stamp t4 is used. In a non-limitative example, a timestamp st4 and an incremental counter c4 are used.

Hence, the following operations are performed to compute the REST API call argument Arg:

E60' (illustrated F60'(arg-data, URL,UID, AuthN', st4, c4,)): arg-data=URL+UID+st4+c4+AuthN'

E61'(illustrated F61'(mac3, arg-data, K-dm)): mac3=M{arg-data}K-dm E62' (illustrated F62'(Arg, mac3, arg-data, K-de)): Arg=E{arg-data+mac3}K-de This REST API call argument Arg is then appended to the REST API call API_c as authorization to make the REST API call API_c. Unlike other authorization tokens that are long lived, this authorization is a direct result of the user identity verification. As it lasts only during the REST API call within with it is embedded, there is less chance that an attack of a malevolent third party will succeed.

In step E8' (illustrated in FIG. 1 F8'(CA, A1, SA, API_c (Arg))), said client application A1 through said user access device CA make a remote REST_API call API_c with said API call argument Arg as authorization to said distant server SA. Each remote REST_API call is standalone. The purpose of the REST API call is to connect to a specific endpoint (URL) on the distant server SA and to ask access on behalf of a user through his/her unique user identifier UID. It is to be noted that contrary to the first method 1, there is no end-2-end communication channel, such as http or https, between the secure peripheral device DA and the distant server SA.

In step E9' (illustrated F9'(SA, A2, Arg, API_c)), upon receiving said REST API call API_c, the server application A2 through said distant server SA extracts said REST API call argument Arg from said REST API call API_c and verifies (step E10' illustrated F10'(SA, A2, Arg)) the validity of said REST API call argument Arg based on said secret device key K-d which has been stored within said distant server SA during the user-binding process 20. This is possible since the server application A2 has the encryption key K-de and the authentication code key K-dm corresponding to the user U1.

Hence, the following operations are performed:

E100' (illustrated F100'(arg-data, mac3, K-de)): arg-data, mac3=D{Arg}K-de, E101' (illustrated F101'(mac3', K-dm)): mac3'=M{arg-data}K-dm, E102' (illustrated F102'(mac3', mac3)): compare mac3' with mac3

E103' (illustrated F103'(arg-data, AuthN')): extract AuthN' from arg-data and verifies if the value is set to "True".

If mac3' matches mac3, the verification of the integrity of the REST API call argument Arg is successful. The comparison of the mac3' with mac3 permits the checking of the integrity of the REST API call argument Arg.

In step E11' (illustrated F11'(SA, A2, U1, S, Sp1)), according to said verification, said server application A2 through said distant server SA grants or denies the user U1 access to said service S through said user access device CA. Hence, if the REST API call argument Arg is valid, it means that the user authentication is valid, and the server application A2 grants the access to the service S, here the money transfer service S in the non-limitative given example. If not, it denies the access. Hence, it denies the user U1 access to said service S if:

mac3' differs from mac3, or

AuthN' is set to "False".

In a non-limitative embodiment, said server application A2 through said distant server SA grants or denies the user U1 access to said service S through said user access device CA according also to security policies Sp1. Indeed, it is to be noted that depending of the user U1 and of the service S requested, it is not because the user authentication is valid that the distant server SA is mandate to always grant the access to the service S for this user U1. The distant server SA may have some restriction like white list or black list of users U1 that have the right to use the service S. Furthermore, all the services s may not be accessible by one user U1. These information are registered at the distant server SA level as the security policies Sp1. It may exists more open security policies Sp1 like if the user U1 is authenticated, he can access to everything. Hence, in a non-limitative embodiment, the grant or deny is further based on the security policies Sp1 associated to said unique user identifier UID for each service S. If the service access request Rq4 is in line with the security policies Sp1 of the server application A2, the access is granted, otherwise the server application A2 rejects the access.

Hence, the second method 4 is carried out by a second system 5 for granting a user U1 access through the user access device CA hosting a client application A1 to a service S coming from a set ST of services S of the server application A2 hosted by the distant server SA, wherein said second system 5 comprises said user access device CA, said distant server SA and the secure peripheral device DA to which said user access device CA is logically connected to, said secure peripheral device DA hosting the device application A3. Said second system 5 is also called system 5 in the following.

Said system 5 is illustrated in FIG. 6.

Hence, the distant server SA is configured by means of said server application A2 to:

upon receiving a REST API call API_c with an API call argument Arg from said user access device CA, extract said REST API call argument Arg from said REST API call API_c (function illustrated f10'(SA, A2, Arg, API_c)), verify the integrity of said REST API call argument Arg based on a secret device key K-d which has been stored within said distant server SA during a user-binding process 20 (function illustrated f11'(SA, A2, Arg, K-d)), according to said verification, grant or deny the user U1 access to said service S through said user access device CA (function illustrated f12'(SA, A2, CA, U1, S, Sp1)).

The distant server SA is further configured by means of said server application A2 to perform the steps of the binding process 20.

The device application A1 through the user access device CA performs the user authentication and confirms the user identity ID. During a same flow, it confirms the user identity and performs the remote REST API call to the server application A2. Hence, the user access device CA is configured by means of said client application A1 to:

upon receiving from said secure peripheral device DA the service access request Rq4 to said service S, send back a user authentication request Rq5, the URL of said service S, and an unique user identifier UID (function illustrated f20'(CA, A1, DA, Rq5, URL, UID, t2)), receive from said secure peripheral device DA the REST API call argument Arg, said REST API call argument Arg being based on a flag AuthN', said URL, said unique user identifier UID, and said secret device key K-d (function illustrated f21'(CA, A1, DA, Arg(AuthN', URL, UID, K-d))), make a remote REST API call API_c to said distant server SA with said API call argument Arg (function illustrated f22'(CA, A1, SA, API_c(Arg))).

The user access device CA is further configured by means of said client application A1 to perform the steps of the binding process 20.

Finally, the secure peripheral device DA is configured by means of said device application A3 to:

receive a service access request Rq4 to said service S and forward it to said user access device CA (function illustrated f30'(DA, A3, CA, Rq4)), upon receiving from said user access device CA a user authentication request Rq5, an URL of said service S, and an unique user identifier UID, check the user identity ID (function illustrated f31'(DA, A3, ID)), build a flag AuthN' according to said checking using the result of a comparison between user data signals Ds and the ones Ds' that have been stored within said secure peripheral device DA during the user-device binding process 20, or relying on a last user authentication validity if a period of time T1 is not exceeded (function illustrated f32'(DA, A3, AuthN')), compute the REST API call argument Arg based on said flag AuthN', said URL, said unique user identifier UID, and said secret device key K-d associated to a unique user identifier UID and to said URL and which has been stored within said secure peripheral device DA during the user-device binding process 20 (function illustrated f33'(DA, A3, Arg(AuthN', URL, UID, K-d(URL, UID, t4)))), and send it to said user access device CA (function illustrated f34'(DA, A3, CA, Arg)).

The secure peripheral device DA is further configured by means of said device application A3 to perform the steps of the binding process 20.

It is to be understood that the present invention is not limited to the aforementioned embodiments and variations and modifications may be made without departing from the scope of the invention. All statements herein reciting principles, aspects, and embodiments of the invention, as well as specific examples thereof, are intended to encompass equivalents thereof. In the respect, the following remarks are made. Hence, in another non-limitative embodiment, the biometric data Ds are DNA data. In a non-limitative example, the DNA data are extracted from some cells of the skin coming from a finger. Hence, in another non-limitative embodiment, the secure peripheral device DA is a dedicated label. Hence, in another non-limitative embodiment, the cryptographic operations can be done with a match on the distant server SA, instead with a match on the secure peripheral device DA. It means that enrolled user data signals Ds can be stored on the distant server SA instead of the secure peripheral device DA and the matching is verified by the distant server SA. For example, when the user puts his finger on the fingerprint scanner of the mouse DA, his fingerprint (that is the user data signals Ds) is read and is sent to the distant server SA. The distant server SA then compares the stored value of the fingerprint (that has been enrolled during the binding process 20) with the currently received value.

Hence, some embodiments of the invention may comprise one or a plurality of the following advantages:

it complies with the zero trust security model, as it allows user identity verification as frequently as deemed necessary, it allows getting first hand user identity verification when making service access decisions, it allows blending user identity verification into the actual application flow, it allows having forced or silent user identity verification, instead of using indirect signals such as an IP address throughout a user session Se1, the standard environment of the user such as the data the user usually uses, it uses direct signals (user biometric data) for user identity verification that leads to a stronger solution for user identity verification, as there is greater risk that the indirect signals will be compromised or faked, it provides a stronger solution for user identity verification with direct signals contrary to other solutions that use indirect signals, such as a CASB ("Cloud Access Security Broker") solution, a CAEP/SSE ("Continuous Access Evaluation Protocol/Shared Signals and Events") solution, or a solution that breaks the application flow as it requires a redirection to a third security distant server that needs a proof of token such as an OTP ("One Time Password"), it provides a seamless solution through direct signals according the server application A2 policies Sp1, as the user doesn't always know that his/her identity is checked and therefore the user's experience doesn't change when accessing an application, it provides a stronger solution against replay attacks contrary to long lived tokens, it provides a stronger solution contrary to perimeter based security such as VPN solution, it allows continuous authentication to be done with the same level of assurance as the initial authentication which uses a 2FA authentication such as a user/password combined with an OTP, in the case of the first method 1.

The invention claimed is:

1. A method for granting a user access through a user access device hosting a client application to a service(S) coming from a set of services of a server application hosted by a distant server, wherein said method comprises:

during a user session, receiving by said client application through said user access device a service access request and forwarding it to said distant server, sending by said server application through said distant server a user authentication request, a primary challenge, an URL of said service, and a unique user identifier to said user access device that forwards them to a secure peripheral device to which it is logically connected to, said user access device acting as a gateway between said secure peripheral device and said distant server, said secure peripheral device hosting a device application, upon receiving said user authentication request, checking by said device application through said secure peripheral device the user identity, building by said device application through said secure peripheral device a flag according to said checking using the result of a comparison between user data signals and the ones that have been stored within said secure peripheral device during a user device binding process, or relying on a last user authentication validity if a period of time is not exceeded, generating by said device application through said secure peripheral device a primary response based on said flag, on said primary challenge, and on a secret device key associated to said unique user identifier and to said URL and which has been stored within said secure peripheral device during the user device binding process, wherein the secret device key is a shared secret between said secure peripheral device and said distant server, sending back by said device application through said secure peripheral device said primary response to said user access device that forwards it to said distant server, verifying by said server application through said distant server the validity of said primary response based on the secret device key, according to said primary response, granting or denying by said server application through said distant server the user access to said service through said user access device.

2. The method according to claim 1, wherein said primary response is generated based further on at least one stamp.

3. The method according to claim 1, wherein the user data signals are biometric data.

4. The method according to claim 1, wherein said secure peripheral device is a mouse with fingerprint scanner or a keyboard with fingerprint scanner, or a Smartphone with fingerprint scanner or with a front camera.

5. The method according to claim 1, wherein if the last user authentication validity is not valid, the method further comprises the display of a primary message inviting the user to authenticate himself by inputting his user data signals through said secure peripheral device.

6. The method according to claim 1, wherein the last user authentication validity is verified according to a timestamp transmitted when the user session has started.

7. The method according to claim 1, wherein the secret device key is composed of an encryption key and of a message authentication code key, and the verifying of the validity of the primary response is performed by:

verifying its integrity using said message authentication code key, and deciphering a primary cryptogram using said encryption key and comparing it to said primary challenge, and verifying said flag.

8. The method according to claim 1, wherein said server application through said distant server grants or denies the user access to said service through said user access device according also to security policies.

9. The method according to claim 1, wherein the user device binding process comprises:

receiving by said client application through said user access device a binding request comprising user credentials, and forwarding it to said distant server, verifying by said server application through said distant server said user credentials, computing by said server application through said distant server a primary hash based on one of said user credentials and said secret device key based on said URL, on said primary hash and on said unique user identifier, and storing said secret device key and said primary hash, sending back by said server application through said distant server said unique user identifier, said URL and a secondary challenge to said user access device, computing by said client application through said user access device a secondary hash based on said one of said user credential, and forwarding it with said unique user identifier, said URL, said secondary challenge to said secure peripheral device, displaying by said client application through said user access device instructions for the user to input user data signals for performing user enrollment, computing by said device application through said secure peripheral device said secret device key based on said URL, on said unique user identifier and said secondary hash, and store a mapping of said secret device key with the user data signals, said unique user identifier, and said URL, generating by said device application through said secure peripheral device a secondary response based on said secondary challenge and on said secret device key, and send it to said user access device that forwards it to said distant server, verifying by said server application through said distant server the validity of said secondary response, if said secondary response is valid, storing by said server application through said distant server a mapping of the secret device key with the unique user identifier and said URL.

10. The method according to claim 9, wherein said secondary response is generated based further on at least one stamp.

11. The method according to claim 9, wherein the reception of said binding request is triggered when said server application through said distant server receives from said user access device a login request to a user account related to said server application.

12. The method according to claim 9, wherein the user device binding process further comprises:

notifying by said server application through said distant server the completion of the user device binding to said user access device that forwards it to said secure peripheral device, displaying by said client application through said user access device a secondary message indicating the completion of the user device binding.

13. A distant server for granting a user access through a user access device to a service coming from a set of services of a server application, wherein said distant server hosts said server application and is configured by means of said sever application to:

during a user session, receive a service access request from the user access device, send to said user access device a user authentication request, a primary challenge, an URL of said service and a unique user identifier, to be forwarded by said user access device to a secure peripheral device to which it is logically connected to, said user access device acting as a gateway between said secure peripheral device and said distant server, receive a primary response forwarded by said user access device and coming from said secure peripheral device, said primary response being based on a flag, on said primary challenge, and on a secret device key associated to said URL and which has been stored within said secure peripheral device during a user device binding process, said flag being set up according to a checking of the user identity by said device application through said secure peripheral device using the result of a comparison between user data signals and the ones that have been stored within said secure peripheral device during a user device binding process, or relying on a last user authentication validity if a period of time is not exceeded, wherein the secret device key is a shared secret between said secure peripheral device and said distant server, verify the validity of said primary response based on the secret device key, according to said primary response, grant or deny the user access to said service through said user access device.

14. A secure peripheral device for checking a user identity for accessing a service through a user access device, said service coming from a set of services of a server application hosted by a distant server, wherein said secure peripheral device hosts a device application and is configured by means of said device application to:

receive from said user access device a user authentication request, a primary challenge, an URL of said service, and a unique user identifier, coming from said distant server, said user access device acting as a gateway between said distant server and said secure peripheral device to which it is logically connected to, upon receiving said user authentication request, check the user identity, build a flag according to said checking, using the result of a comparison between user data signals and the ones that have been stored within said secure peripheral device during the user device binding process, or relying on a last user authentication if a period of time is not exceeded, generate a primary response based on said flag, on said primary challenge and on a secret device key associated to a unique user identifier and to said URL and which has been stored within said secure peripheral device during a user device binding process, wherein the secret device key is a shared secret between said secure peripheral device and said distant server; and send back to said distant server through said user access device said primary response for verification of its validity by said distant server, based on the secret device key.

15. An user access device for accessing a service coming from a set of services of a server application hosted by a distant server, wherein said user access device is acting as a gateway between said distant server and a secure peripheral device to which it is logically connected to, and hosts a client application and is configured by means of said client application to:

receive a service access request, forward to said distant server said service access request, forward to said secure peripheral device, a user authentication request, a primary challenge, an URL of said service, and a unique user identifier, coming from said distant server, forward to said distant server a primary response coming from said secure peripheral device, said primary response being based on a flag, on said primary challenge, and on a secret device key associated to a unique user identifier and to said URL and which has been stored within said secure peripheral device during a user device binding process, said flag being set up according to a checking of the user identity by said device application through said secure peripheral device using the result of a comparison between user data signals and the ones that have been stored within said secure peripheral device during a user device binding process, or relying on a last user authentication validity if a period of time is not exceeded, wherein the secret device key is a shared secret between said secure peripheral device and said distant server.

16. A system for granting a user access through a user access device hosting a client application to a service coming from a set of services of a server application hosted by a distant server, wherein said system comprises said user access device, said distant server and a secure peripheral device to which said user access device is logically connected to, said secure peripheral device hosting a device application, and wherein:
  said distant server is configured by means of said server application to:
    during a user session, receive service access request from the user access device,
    send a user authentication request, a primary challenge, an URL of said service, and a unique user identifier to said user access device to be forwarded to said secure peripheral device,
    receive a primary response forwarded by said user access device and coming from said secure peripheral device, said primary response being based on a flag, on said primary challenge, and on a secret device key associated to said URL and which has been stored within said secure peripheral device during a user device binding process, said flag being set up according to a checking by said device application through said secure peripheral device of the user identity using the result of a comparison between user data signals and the ones that have been stored within said secure peripheral device during a user device binding process, or relying on a last user authentication validity if a period of time is not exceeded, wherein the secret device key is a shared secret between said secure peripheral device and said distant server,
    verify the validity of said primary response based on the secret device key,
  according to said primary response, grant or deny the user access to said service through said user access device,
  said user access device is acting as a gateway between said secure peripheral device and said distant server,
  said user access device is configured by means of said client application to:
    receive a service access request,
    forward to said distant server said service access request,
    forward to said secure peripheral device said user authentication request, said primary challenge, said URL, and said unique user identifier, coming from said distant server,
    forward to said distant server said primary response coming from said secure peripheral device,
  said secure peripheral device is configured by means of said device application to:
    receive from said user access device said user authentication request, said primary challenge, said URL of said service, and said unique user identifier, coming from said distant server, said user access device acting as a gateway between said distant server and said secure peripheral device to which it is logically connected to,
    upon receiving said user authentication request, check the user identity,
    build a flag according to said checking using the result of a comparison between user data signals and the ones that have been stored within said secure peripheral device during the user device binding process, or relying on a previous user authentication if a period of time is not exceeded,
    generate said primary response based on said flag, on said primary challenge and on a secret device key associated to said unique user identifier and to said URL and which has been stored within said secure peripheral device during the user device binding process,
    send back to said user access device said primary response to be forwarded to said distant server.

* * * * *